Apr. 24, 1923.
S. A. SNELL
STEERING WHEEL
Filed May 16, 1922
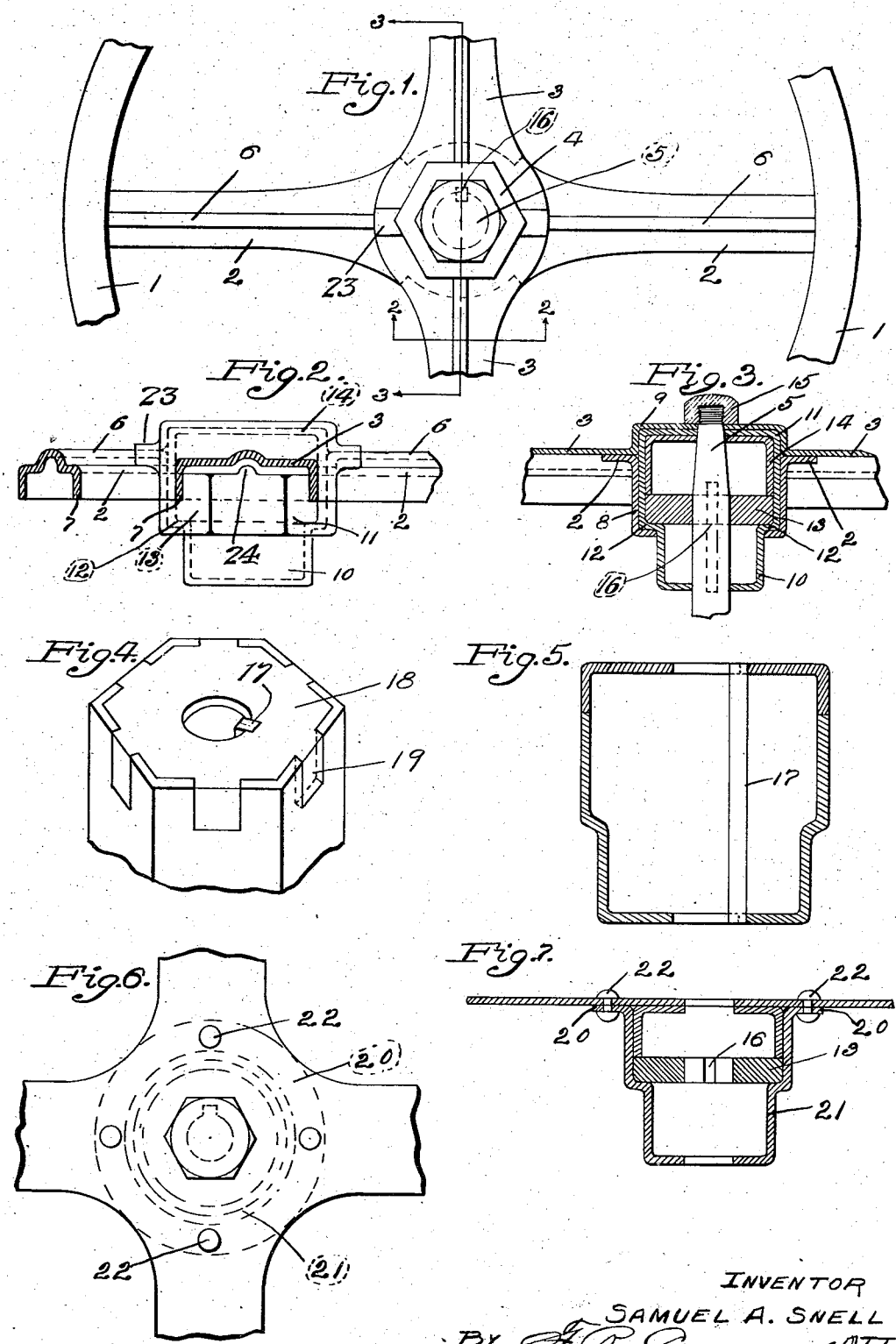
INVENTOR
SAMUEL A. SNELL
BY J. R. Cornwall ATTY.

Patented Apr. 24, 1923.

1,452,534

UNITED STATES PATENT OFFICE.

SAMUEL A. SNELL, OF ST. LOUIS, MISSOURI, ASSIGNOR TO HARRY W. BUNDY, OF DETROIT, MICHIGAN.

STEERING WHEEL.

Application filed May 16, 1922. Serial No. 561,410.

*To all whom it may concern:*

Be it known that I, SAMUEL A. SNELL, a subject of the King of Great Britain, residing at St. Louis, State of Missouri, U. S. A., have invented a certain new and useful Improvement in Steering Wheels, of which the following is a full, clear, and exact description, such as will enable others skilled in the art to which it appertains to make and use the same, reference being had to the accompanying drawings, forming part of this application.

My invention relates to wheel construction and is especially adapted for use in connection with steering wheels for automobiles, tractors, and like machinery. The invention comprises an improved spoke and hub construction for wheels of the type shown in United States Letters Patent to Harry W. Bundy, No. 1,375,670.

The main object of my invention is to provide a wheel composed entirely of stampings, thereby eliminating the expensive machine-work which has heretofore been required in all wheels of this type with which I am familiar.

Other objects will appear from the following specification and from the accompanying drawings forming a part of my application, in which—

Figure 1 is a fragmentary top view of my improved steering wheel.

Figures 2 and 3 are vertical sections on lines 2—2 and 3—3 of Figure 1, respectively.

Figures 4 and 5 are an isometric view of a modified hub and a vertical section through the same.

Figures 6 and 7 are a top and a vertical section through another modified form of my invention.

The wheel as illustrated in Figure 1 includes a rim 1 of any desired shape and material, diametral members 2 and 3, disposed transversely of each other and forming the four spokes for the wheel, and a composite hub 4 by which the wheel is mounted upon a steering shaft 5 or the like. The shape of members 2 and 3 is best indicated in Figure 2 in which member 3 is cross-sectioned and member 2 is shown in side elevation, each member being of a shallow channel-shape and provided with a centrally located longitudinal reinforcing rib 6. Member 3 has a transverse corrugation 23 at its middle which fits over rib 6 on member 2 where the spoke members cross each other, thus forming an interlocking engagement. A similar transverse corrugation 24 is provided in member 2 (Figure 2). The flanges 7 of both members 2 and 3 are turned downwardly. At the middle of the wheel, members 2 and 3 are each provided with recessed bosses 8 and 9, respectively. These bosses extend in opposite directions and their recesses being opposed are adapted to receive and retain the hub 4.

Hub 4 consists in a cup-like body, the lower portion 10 of which is cylindrical in section and the upper portion 11 is hexagonal. At the junction of the upper and lower portions of the hub, a shoulder 12 is formed and a hexagonal washer 13 is fitted in the interior of the upper portion 11 and rests upon shoulder 12. An inverted cup 14 is also fitted within the upper portion 11 of the hub body and the bottom of the cup forms the top of the hub, the edges of the sides of the cup engaging the top of washer 13 and holding the latter in position. The bottom of the hub body, washer 13, and the bottom of cup 14 are provided with central openings aligned with similar openings in the bosses 8 and 9, all of which openings receive the upper portion of the steering shaft 5 and the wheel is retained on the shaft by means of an acorn nut 15. The opening in washer 13 is slotted at 16 to receive a key also seated in the side of the steering shaft, thus locking the wheel and shaft against relative angular movement.

The flanges 7 of the arms 2 and 3 terminate and abut each other where they intersect, thereby providing an additional interlocking engagement. The arms may be welded together at these or similar points to further provide a rigid integral construction with no joints to loosen and permit undesirable play between the wheel rim and the steering shaft.

This construction enables the wheel to be produced much more economically than those in which the hub is machined out of a solid bar or a tube to which the wheel is secured by rivets, bolts or other threaded devices. All of the details are punch-press operations and may be assembled with minimum expense. The presence of ribs 6 and flanges 7 throughout the spoke portion of the arms provides ample material to form the cup-like bosses 8 and 9 at the hub portions of the arms.

In the modification as shown in Figures 4 and 5 the key-holding washer of the preferred form is omitted and a longitudinal key 17 is provided extending from end to end of the hub. In this form also the inverted cup 18 forming the upper portion of the hub has its sides dove-tailed into the sides of the hub body as indicated at 19.

In the modification shown in Figures 6 and 7 the hub is adapted to be applied to a wheel in which all of the spokes are stamped from a single blank or in which the hub bosses shown in a two arm construction may be omitted, and the two arms simply flattened out at the center and secured to the flanges 20 of the hub 21 by means of screws or rivets 22. In all of these forms the essential feature of my invention, that is, the stamped hub, is retained and embodied in different forms.

I contemplate other modifications of the construction and assembly of the wheel parts in the commercial development of my invention and include all such as fall within the scope of the appended claims.

I claim:

1. A steering wheel comprising a rim, overlapped spokes having interengaging elements at their overlapped portions and provided with non-circular bosses aligned axially of the wheel, a hollow hub fitting in said bosses, and a transverse element fixed in said hub provided with a key slot paralleling the axis of the wheel and adapted to engage a steering shaft key.

2. A steering wheel comprising a rim, spokes, and a hollow polygonal hub seated in said spokes, a polygonal washer located transversely and interiorly of said hub and provided with a key slot, and an inverted cup for retaining said washer and provided with an opening to receive the top of a wheel spindle.

3. A steering wheel hub comprising a hollow stamping provided with an interior shoulder, a transverse washer seated on said shoulder, and an inverted cup-like cap pressed into the larger end of said hub and holding said washer against said shoulder.

4. A steering wheel hub comprising a hollow polygonal stamping provided with an interior shoulder, a transverse polygonal washer seated on said shoulder, and an inverted cup-like cap seated in the larger end of said hub and having a polygonal side, the edges of which hold said washer against said shoulder, said washer being provided with a key slot, and said washer, hub, and cap being provided with steering shaft openings.

5. In a steering wheel, a polygonal hub, a spoke provided with a polygonal recess fitting over said hub, and with a longitudinal rib extending radially of said hub, a second spoke extending transversely of said first-mentioned spoke and provided with a transverse corrugation fitting over said rib to lock said spokes against relative angular movement.

6. In a steering wheel, diametral members disposed transversely of each other, each provided with a longitudinal rib and each provided with a transverse corrugation fitting the rib on the other member to hold the members against relative angular movement.

7. In a steering wheel, spoke arms of channel-section, the flanges of which abut at their intersection to form an interlocking engagement of the arms.

8. In a steering wheel, spoke arms of channel-section, the flanges of which are cut away near the middles of said arms, said arms being arranged transversely of each other and maintained in relative angular position by the abutment of the inner ends of the flanges.

In testimony whereof I hereunto affix my signature this 8th day of May, 1922.

SAMUEL A. SNELL.